United States Patent
Bross et al.

(10) Patent No.: US 10,776,371 B2
(45) Date of Patent: Sep. 15, 2020

(54) EXTENDED PATH FINDING OPERATIONS ON GRAPH DATA

(71) Applicant: SAP SE, Walldorf (DE)

(72) Inventors: Jan Bross, Sandhausen (DE); Marcus Paradies, Erfurt (DE); Romans Kasperovics, Speyer (DE); Thomas Fischer, Sandhausen (DE)

(73) Assignee: SAP SE, Walldorf (DE)

( * ) Notice: Subject to any disclaimer, the term of this patent is extended or adjusted under 35 U.S.C. 154(b) by 232 days.

(21) Appl. No.: 15/946,385

(22) Filed: Apr. 5, 2018

(65) Prior Publication Data
US 2019/0311060 A1    Oct. 10, 2019

(51) Int. Cl.
*G06F 16/2458*  (2019.01)
*G06F 16/901*  (2019.01)

(52) U.S. Cl.
CPC ...... *G06F 16/2465* (2019.01); *G06F 16/9024* (2019.01)

(58) Field of Classification Search
CPC .. G06F 16/951; G06F 16/285; G06F 16/9024; G06F 16/2465; G06Q 90/00
See application file for complete search history.

(56) References Cited

U.S. PATENT DOCUMENTS

| | | | | |
|---|---|---|---|---|
| 2011/0134127 A1* | 6/2011 | Gundlapalli | ........... | G06Q 90/00 345/440 |
| 2012/0317142 A1* | 12/2012 | Broecheler | ......... | G06F 16/9024 707/770 |
| 2016/0063132 A1* | 3/2016 | Chen | ................... | G06F 16/9024 707/609 |
| 2016/0210294 A1* | 7/2016 | Komarov | ............... | G06F 16/951 |
| 2017/0116315 A1* | 4/2017 | Xiong | ................... | G06F 16/285 |

* cited by examiner

*Primary Examiner* — Etienne P Leroux
(74) *Attorney, Agent, or Firm* — Mintz Levin Cohn Ferris Glovsky and Popeo, P.C.

(57) ABSTRACT

A method for performing a path finding operation in graph data stored in a database is provided. The method may include receiving, from a client, a request to perform a weighted path operation on at least portion of the graph data. The portion of the graph data may correspond to a graph. The request may specify attributes associated with vertices and/or edges included in the graph. In response to the request, the weighted path operation may be performed by at least identifying a shortest path between two endpoints in the graph. The shortest path may minimize the one or more attributes of vertices and/or edges included in the shortest path. Related systems and articles of manufacture, including computer program products, are also provided.

20 Claims, 9 Drawing Sheets

EXTENDED PATH FINDING OPERATIONS ON GRAPH DATA

TECHNICAL FIELD

The subject matter described herein relates generally to database processing and more specifically to extended path finding operations on graph data stored in a database.

BACKGROUND

A database may be configured to store data in accordance with a database schema. For example, in a graph database, data may be represented and stored using graph structures including, for example, vertices, directed edges, undirected edges, and/or the like. Notably, the graph database may store the relationships between different data items explicitly. For instance, the vertices of a graph may correspond to the individual data items stored in the graph database while the edges of the graph may define the relationships between these data items. Attributes associated with the vertices and/or the edges may provide additional properties for the data items stored in the graph database and/or the relationships that exist between different data items.

By contrast, a relational database may store the relationships between different data items implicitly, for example, by organizing the data items into one or more database tables. Each database table may store a set of data items referred to as a relation. Furthermore, the rows of the database table may hold individual data items while the columns of the database table may hold the attributes that are present in each of the data items. Meanwhile, relationships between data items residing in different database tables may be implicitly defined by cross referencing the key that is associated with each data item in the relational database. For instance, a first database table may store the keys of data items from a second database table, thereby linking data items held in two separate database tables. Alternately and/or additionally, data items from the first database table and the second database table may be linked via a third database table storing the keys of data items from both the first database table and the second database table.

SUMMARY

Systems, methods, and articles of manufacture, including computer program products, are provided for performing a path finding operation on graph data stored in a database. In one aspect, there is provided a system including at least one data processor and at least one memory. The at least one memory may store instructions that cause operations when executed by the at least one data processor. The operations may include: receiving, from a client, a request to perform a weighted path operation on at least portion of graph data stored in a database, the portion of the graph data corresponding to a graph, the request specifying one or more attributes associated with a plurality of vertices and/or edges included in the graph; and in response to the request, performing the weighted path operation by at least identifying a shortest path between two endpoints in the graph, the shortest path minimizing the one or more attributes of one or more vertices and/or edges included in the shortest path.

In some variations, one or more features disclosed herein including the following features can optionally be included in any feasible combination. The database may be a relational database that includes a vertex table and an edge table for storing the graph data. The storage of the graph data may include storing, in the vertex table and/or the edge table, the one or more attributes associated with the plurality of vertices and/or edges included in the graph.

In some variations, a weight may be determined for each of the plurality of vertices and/or edges. The weight may correspond to a function of the one or more attributes specified by the request. A same weight may be assigned to each of the plurality of vertices and/or edges in order for the shortest path to minimize a quantity of intervening vertices and/or edges between the two endpoints.

In some variations, the shortest path may be associated with a first weight comprising a sum of one or more weights associated with the one or more vertices and/or edges included in the shortest path. The shortest path may be identified based at least on the first weight being less than a second weight of at least one other path between the two endpoints. The first weight and/or the second weight may be stored as a weight attribute of a corresponding path.

In some variations, the response to another request from the client may include extracting, from the shortest path, at least a portion of an ordered sequence comprising the one or more vertices and/or edges included in the shortest path.

In some variations, the performance of the weighted path operation may further include generating a weighted path object corresponding to the shortest path. The weighted path object may include a snapshot of the graph. The snapshot of the graph may inherit all attributes and/or temporary attributes associated with the plurality of vertices and/or edges included in the graph. Changes to the attributes and/or temporary attributes may not propagated to the snapshot of the graph.

In some variations, the two end points may include a vertex and/or an edge from the graph.

In some variations, the weighted path operation may include a stored procedure such that executable code associated with the weighted path operation is stored in the database.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A relational database may be configured to store a graph by at least storing the corresponding graph data in a vertex table and an edge table. For example, storing the graph in the relational database may include storing, in the vertex table, the vertices of the graph including, for example, the keys and the attributes associated with each vertex. Furthermore, storing the graph in the relational database may include storing, in the edge table, the edges of the graph including, for example, the keys and the attributes associated with each edge. The graph may include one or more paths, each of which being an ordered sequence of at least a portion of the vertices and/or edges included in the graph. As such, in some example embodiments, the relational database may support one or more path finding operations for identifying, based on the graph data stored in the relational database, one or more of the paths present in the graph.

In some example embodiments, the one or more path finding operations may include a weighted path operation. The weighted path operation may identify, based at least on the weight associated with each of the vertices and/or edges in a graph, a path between two endpoints within the graph. The weight associated with a vertex and/or an edge in the graph may correspond to one or more of the attributes associated with the vertex and/or the edge. For example, the weight of a vertex and/or an edge may correspond to a function (e.g., sum, difference, product, quotient, and/or the like) of the attributes associated with the vertex and/or the edge. Meanwhile, the weight of a path may correspond to a sum of the weights associated with each of the vertices and/or edges included in the path. According to some example embodiments, the weighted path operation may be performed in order to identify a shortest path between two endpoints in the graph. The shortest path between two endpoints in the graph may minimize a quantity of intervening vertices and/or edges between the two endpoints. Alternatively and/or additionally, the shortest path between the two endpoints may minimize a weight across the intervening vertices and/or edges between the two endpoints.

Figure 1:
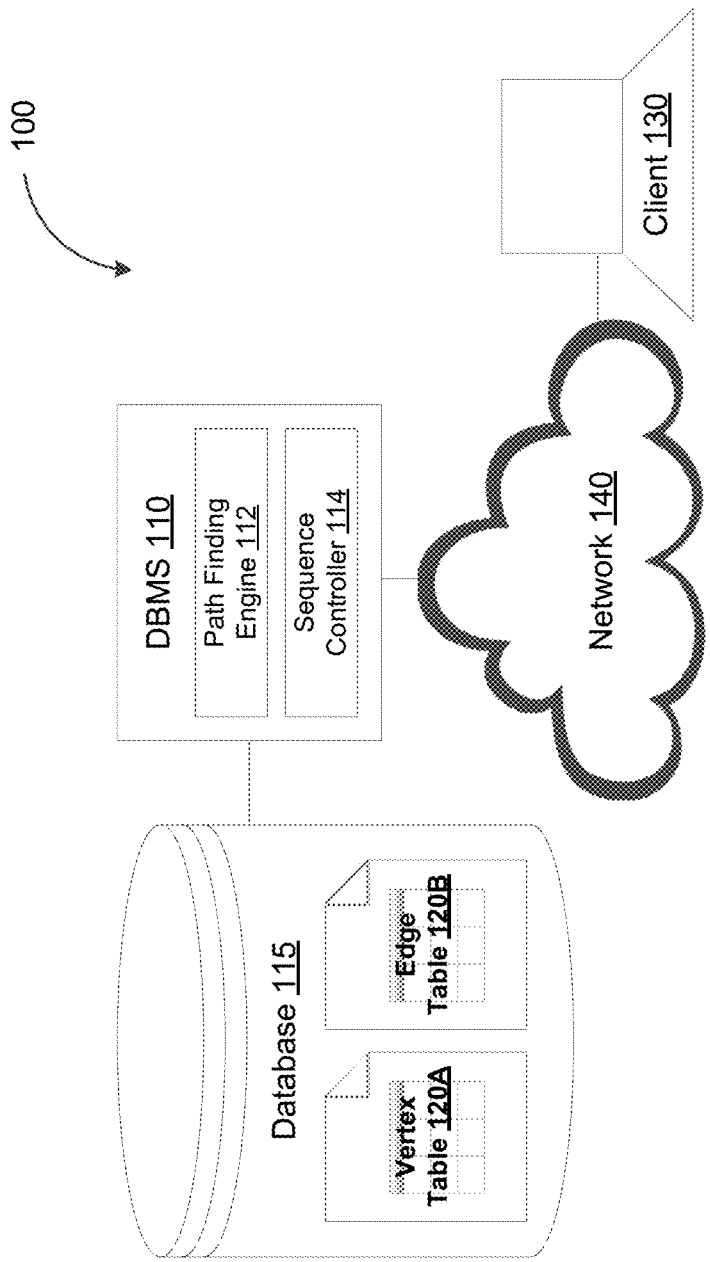
FIG. 1 depicts a system diagram illustrating a data storage system, in accordance with some example embodiments.

FIG. 1 depicts a system diagram illustrating a data storage system 100, in accordance with some example embodiments. Referring to FIG. 1, the data storage system 100 may include a database 115 storing graph data corresponding to one or more graphs. The graph data associated with a graph may include the vertices and/or the edges forming the graph. As such, in some example embodiments, the database 115 may be a relational database configured to store the graph data, for example, in a vertex table 120A and/or an edge table 120B. However, it should be appreciated that the database 115 may be any type of database including, for example, an in-memory database, a hierarchical database, an object database, an object-relational database, a non-Structured Query Language (NoSQL) database, and/or the like. For example, instead of and/or in addition to being a relational database, the database 115 may be a graph database, a column store, a key-value store, a document store, and/or the like.

In some example embodiments, the vertex table 120A may store the vertices of the graph including, for example, the keys and/or the attributes associated with each vertex. Meanwhile, the edge table 120B may store the edges of the graph including, for example, the keys and/or the attributes associated with each edge. The key associated with a vertex and/or an edge may uniquely identify the vertex and/or the edge, for example, by at least differentiating the vertex and/or the edge from other vertices and/or edges included in the graph. Alternatively and/or additionally, the attributes associated with a vertex and/or an edge may provide additional properties associated with the vertex and/or the edge.

Referring again to FIG. 1, the database 115 may be coupled with a database management system 110 that includes, for example, a path finding engine 112 and a sequence controller 114. In some example embodiments, the database management system 110 may be configured to respond to requests from one or more clients of the data storage system 100 including, for example, a client 130. For example, as shown in FIG. 1, the client 130 may communicate with the database management system 110 via a network 140, which may be any wired and/or wireless network including, for example, a public land mobile network (PLMN), a wide area network (WAN), a local area network (LAN), a virtual local area network (VLAN), the Internet, and/or the like.

The client 130 may send, to the database management system 110, a request to perform a path finding operation on the graph data stored in the database 115, for example, in the vertex table 120A and/or the edge table 120B. It should be appreciated that the path finder operation, for example, the weighted path operation, may be a predefined operation and/or a custom operation defined by the client 130. Moreover, the path finder operation may be defined as a stored procedure such that the database management system 110 may store, in the database 115, the executable code corresponding to the path finding operation.

In some example embodiments, the database management system 110, for example, the path finding engine 112, may respond to the request from the client 130 by performing the path finding operation. For example, performing the path finding operation may include identifying one or more paths in the graphs corresponding to at least a portion of the graph data stored in the database 115. According to some example embodiments, the path finding operation may include a weighted path operation. Performing the weighted path operation may include identifying, based on the weight associated with each vertex and/or edge in the graph, a shortest path between two endpoints in the graph. It should be appreciated the endpoints of the shortest path may be pair of vertices and/or edges in the graph. The weight associated with a vertex and/or an edge may corresponding to one more of the attributes associated with the vertex and/or the edge. For instance, the weight of a vertex and/or an edge may correspond to a function (e.g., sum, difference, product, quotient, and/or the like) of the attributes associated with the vertex and/or the edge.

It should be appreciated that the attributes contributing to the weight used to determine the shortest path may be specified by the client 130. That is, the client 130 may specify which attributes should be minimized by the shortest path. For instance, the request from the client 130 may indicate that the weighted path operation should be performed based on one or more of the attributes associated with the vertices and/or the edges of a graph corresponding to at least a portion of the graph data in the database 115. The attributes associated with the vertices and/or edges of the graph may be stored in the database 115, for example, in the vertex table 120A and/or the edge table 120B.

In some example embodiments, the database management system 110, for example, the path finding engine 112, may perform the weighted path operation by at least identifying a shortest path that minimizes a quantity of intervening vertices and/or edges between the two endpoints. Alternatively and/or additionally, the database management system 110, for example, the path finding engine 112, may perform the weighted path operation by at least identifying a shortest path that minimizes a weight across the intervening vertices and/or edges between the two endpoints. As noted, the weight of a vertex and/or an edge may correspond to one or more of the attributes associated with the vertex and/or the edge as specified, for example, in the request from the client 130. Moreover, the shortest path may minimize the quantity and/or weight of intervening vertices and/or edges by at least having a lesser quantity and/or weight than other paths between the same endpoints.

In some example embodiments, performing a path finding operation may generate a path object corresponding to a path, for example, between two endpoints (e.g., vertices and/or edges) in a graph. For example, by performing the weighted path operation in response to the request from the client 130, the database management system 110, for example, the path finding engine 112, may generate a weighted path object corresponding to the shortest path between the two endpoints in the graph. The weighted path object may be associated with a weight attribute corresponding to a sum of the weights of the individual vertices and/or edges included in the shortest path between the two endpoints of the graph. According to some example embodiments, the database management system 110 may store, at least temporarily, the weight attribute associated with the weighted path object in order to obviate a recalculation of the sum of the weights of the individual vertices and/or edges included in the shortest path between the two endpoints of the graph, for example, each time the client 130 requests to perform a weighted path operation.

According to some example embodiments, a path object including, for example, a weighted path object, may be a snapshot of a corresponding graph. As used herein, a snapshot of a graph may refer to a derivative of the graph that includes at least a portion of the vertices and/or edges included in the graph. The snapshot of the graph may inherit, from the graph, one or more temporary attributes for storing modifications to the read-only graph data associated with the graph. However, any changes to the temporary attributes of the graph may be confined to the graph instead of being propagated to the snapshot of the graph.

In some example embodiments, the client 130 may further request to extract, from a path between two endpoints, at least a portion of an ordered sequence of vertices and/or edges forming the path. For example, the client 130 may send, to the database management system 110, a request to extract, from a shortest path identified by the path finding engine 112, an ordered sequence of the vertices and/or edges in the shortest path. The database management system 110, for example, the sequence controller 114, may respond to the request from client 130 by at least extracting, from a weighted path object corresponding to the shortest path, at least a portion of the ordered sequence of vertices and/or edges included in the shortest path. Furthermore, the database management system 110, for example, the sequence controller 114 may return, to the client 130, at least the portion of the ordered sequence of vertices and/or edges included in the shortest path.

Table 1 below depicts programming code implementing a weighted path operation that identifies a shortest path based on the attribute "distance" associated with each edge in a graph. The weighted path operation shown in Table 1 may be a predefined operation and/or a custom operation defined by the client 130. Furthermore, the weighted path operation shown in Table 1 may be defined as a stored procedure such that the database management system 110 may store, in the database 115, the executable code corresponding to the path finding operation.

TABLE 1

```
CREATE TYPE "mySchema", "pathVertices" AS TABLE( -- defining type for path vertex projection
    "IDX" BIGINT, "CITY" VARCHAR(1000));
CREATE PROCEDURE "mySchema", "pathExample" (
    IN FROM_ID NVARCHAR(1000),      -- input parameter "from"
    IN TO_ID NVARCHAR(1000),        -- input parameter "to"
    OUT VTAB "mySchema", "pathVertices",  -- output parameter for projection on path vertices
                                    -- empty if path from FROM_ID to TO_ID does not exist
    OUT LEN BIGINT,                 -- output parameter for path length is hops (number of edges)
    OUT TOTAL_DIST DOUBLE           -- output parameter for path distance
) LANGUAGE GRAPH READS SQL DATA AS
BEGIN
    Graph g = Graph("mySchema", "myGraph");
```

TABLE 1-continued

```
Vertex s = Vertex(:g, :FROM_ID);
Vertex t = Vertex(:g, :TO_ID);
weightedPath<Double> P *                    -- path weight is of type DOUBLE
    SHORTEST_PATH(:g, :s, :t,
    (Edge e) -> { RETURN :e."dist"; });     -- weight function returns edge attribute "dist" as weight
Sequence<Vertex> vseq = Vertices(:p);       -- ordered sequence of vertices of path p
Sequence<Edge> eseq = Edges(:p);            -- ordered sequence of edges of path p
VTAS = SELECT :IDX, :w."CITY"
    FOREACH v IN :vseq WITH ORDINALITY AS IDX; -- project path vertex attributes (and seq. number) into a table
LEN = Count(:eseq):                         -- edge count
TOTAL_DIST = Weight(:p);                    -- extracting weight calculated by the SHORTEST_PATH algorithm
                                            -- (can be equal to edge count, but not necessarily)
END;
```

Figure 2:
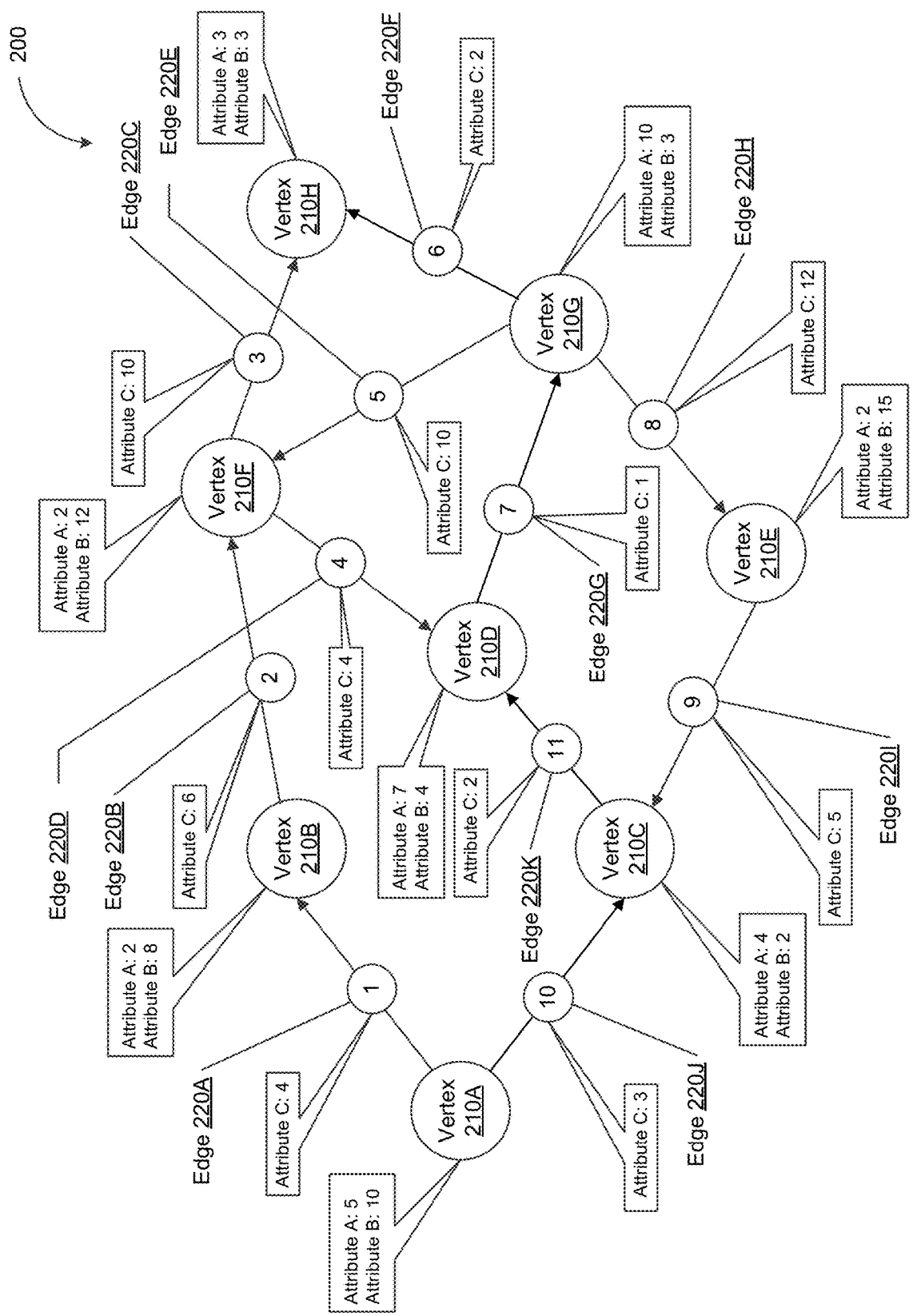
FIG. 2 depicts a graph, in accordance with some example embodiments.

To further illustrate, FIG. 2 depicts a graph 200, in accordance with some example embodiments. In some example embodiments, graph data corresponding to the graph 200 may be stored in the database 115. Referring to FIG. 2, the graph 200 may include a plurality of vertices including, for example, a first vertex 210A, a second vertex 210B, a third vertex 210C, a fourth vertex 210D, a fifth vertex 210E, a sixth vertex 210F, a seventh vertex 210G, and/or an eighth vertex 210H. Each of the plurality of vertices may be associated with one or more attributes including, for example, an attribute A and/or an attribute B. Furthermore, the plurality of vertices may be interconnected by one or more edges. For example, as shown in FIG. 2, the vertices of the graph 200 may be interconnected by a plurality edges including, for example, a first edge 220A, a second edge 220B, a third edge 220C, a fourth edge 220D, a fifth edge 220E, a sixth edge 220F, a seventh edge 220G, an eighth edge 220H, a ninth edge 220I, a tenth edge 220J, and/or an eleventh edge 220K. Each of the plurality of edges may also be associated with one or more attributes including, for example, an attribute C.

The vertex table 120A may store the first vertex 210A, the second vertex 210B, the third vertex 210C, the fourth vertex 210D, the fifth vertex 210E, the sixth vertex 210F, the seventh vertex 2110G, and/or the eighth vertex 210H by at least storing the corresponding keys and/or attributes (e.g., attribute A and/or attribute B). Alternatively and/or additionally, the edge table 120B may store the first edge 220A, the second edge 220B, the third edge 220C, the fourth edge 220D, the fifth edge 22E, the sixth edge 220F, the seventh edge 220G, the eighth edge 220H, the ninth edge 220I, the tenth edge 220J, and/or the eleventh edge 220K by at least storing the corresponding keys and/or attributes (e.g., the attribute C).

In some example embodiments, the client 130 may send, to the database management system 110, a request to perform a path finding operation on the graph data corresponding to the graph 200. As noted, the graph data corresponding to the graph 200 may be stored in the database 115, for example, in the vertex table 120A and/or the edge table 120B. Accordingly, the database management system 110 may respond to the request from the client 130 by at least querying the database 115 including, for example, the vertex table 120A and/or the edge table 120B.

In some example embodiments, the client 130 may request to perform a weighted path operation in order to identify a shortest path between two endpoints in the graph 200. The shortest path between two endpoints in the graph 200 may include a minimum quantity of intervening vertices and/or edges between the two endpoints. Alternatively and/or additionally, the shortest path between two endpoints in the graph 200 may minimize a weight across the intervening vertices and/or edges between the two endpoints. As noted, the weight associated with a vertex and/or an edge may correspond to one or more of the attributes associated with the vertex and/or the edge. Accordingly, the request from the client 130 may specify which attributes (e.g., attribute A, attribute B, and/or attribute C) contribute to the weight used to determine the shortest path between the two endpoints in the graph 200.

Figure 3A:
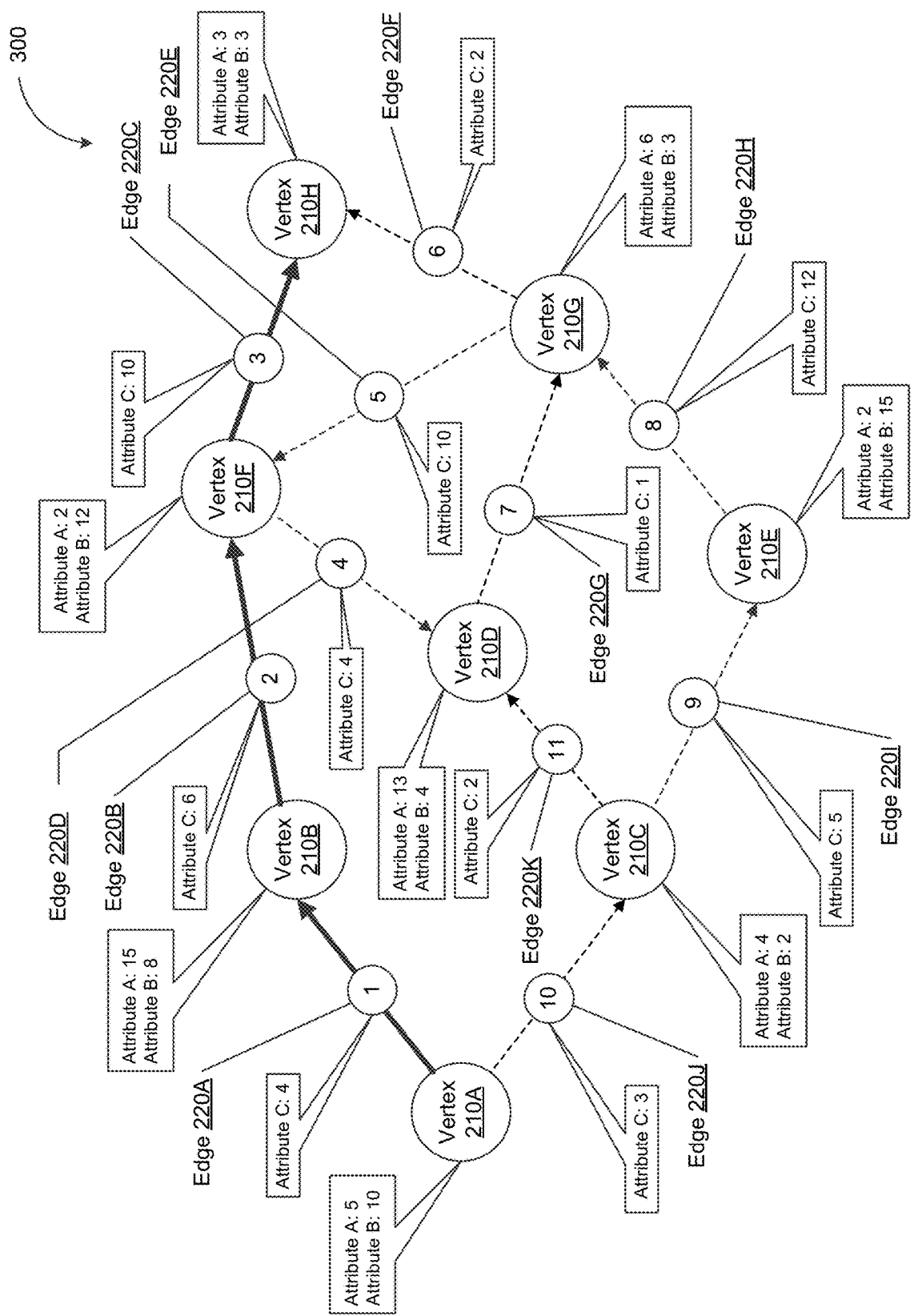
FIG. 3A depicts an example of a shortest path, in accordance with some example embodiments.

For example, FIG. 3A depicts a shortest path 300, in accordance with some example embodiments. Referring to FIG. 3A, the shortest path 300 may be a shortest path between the first vertex 210A and the eighth vertex 210H that minimizes a quantity of intervening vertices and/or edges between the first vertex 310A and the eighth vertex 210H. It should be appreciated that the database management system 110, for example, the path finding engine 112, may identify the shortest path 300 by assigning an equal weight to each of the vertices and/or edges included in the graph 200. The assignment of the weight may disregard the attributes associated with each of the vertices and/or edges. For example, the same weight may be assigned to the first vertex 210A, the second vertex 210B, the third vertex 210C, the fourth vertex 210D, the fifth vertex 210E, the sixth vertex 210F, the seventh vertex 2110G, and/or the eighth vertex 210H regardless of the value of attribute A and/or attribute B associated with each vertex. Alternatively and/or additionally, the same weight may also be assigned to the first edge 220A, the second edge 220B, the third edge 220C, the fourth edge 220D, the fifth edge 22E, the sixth edge 220F, the seventh edge 220G, the eighth edge 220H, the ninth edge 220I, the tenth edge 220I, and/or the eleventh edge 220K regardless of the value of attribute C associated with each edge.

Figure 3B:
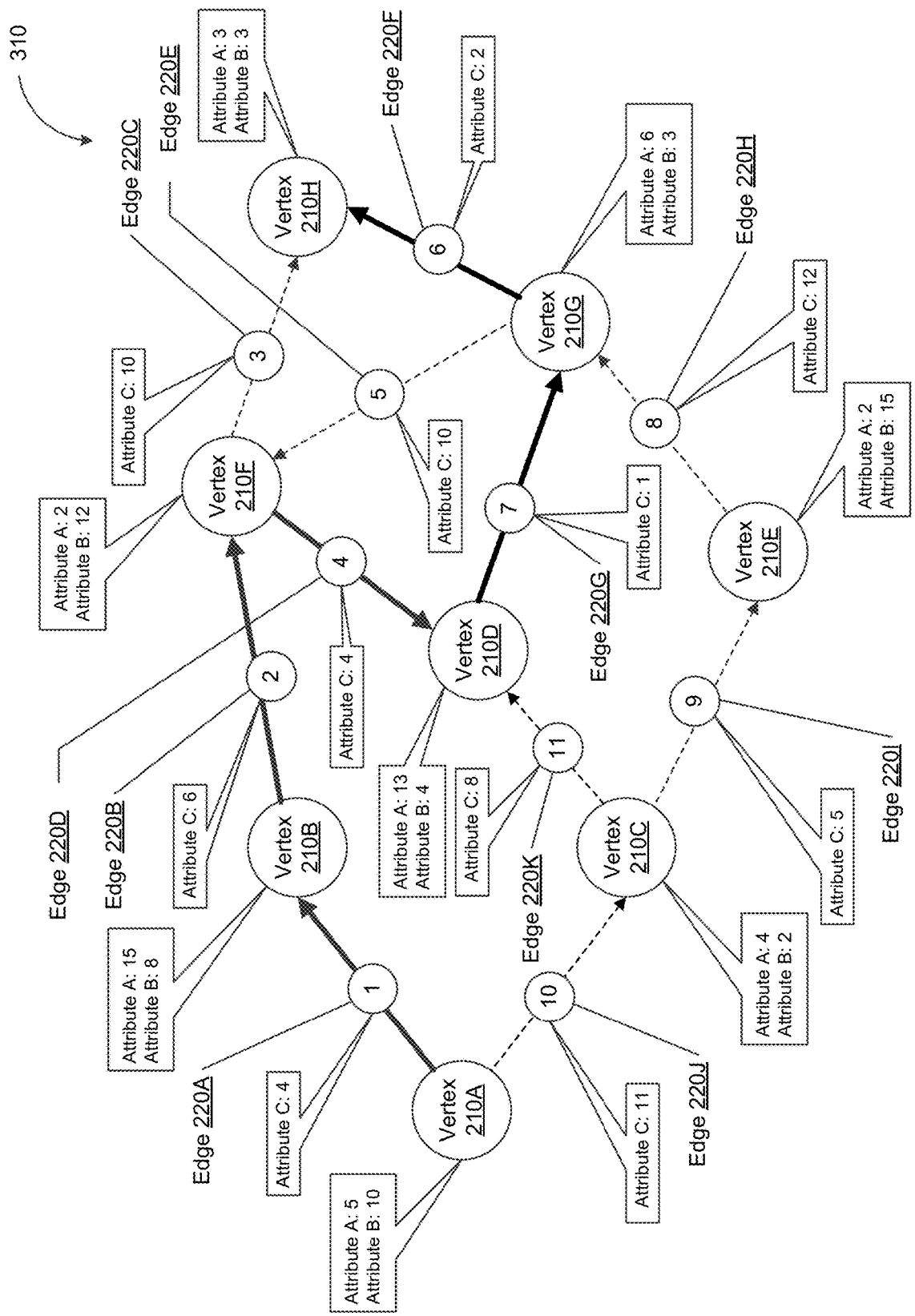
FIG. 3B depicts a shortest path, in accordance with some example embodiments.

FIG. 3B depicts a shortest path 310, in accordance with some example embodiments. Referring to FIG. 3B, the shortest path 310 may be a shortest path between the first vertex 210A and the eighth vertex 210H that minimizes a sum of the values of the attribute C across the edges included in the shortest path 310. The weight associated with the each edge in graph 200 may correspond to the respective values of the attribute C associated with each edge in the graph 200. As such, the database management system 110, for example, the path finding engine 112, may identify the shortest path 310 based at least on a value of the attribute C associated with each the first edge 220A, the second edge 220B, the third edge 220C, the fourth edge 220D, the fifth edge 22E, the sixth edge 220F, the seventh edge 220G, the eighth edge 220H, the ninth edge 220I, the tenth edge 220I, and/or the eleventh edge 220K.

Figure 3C:
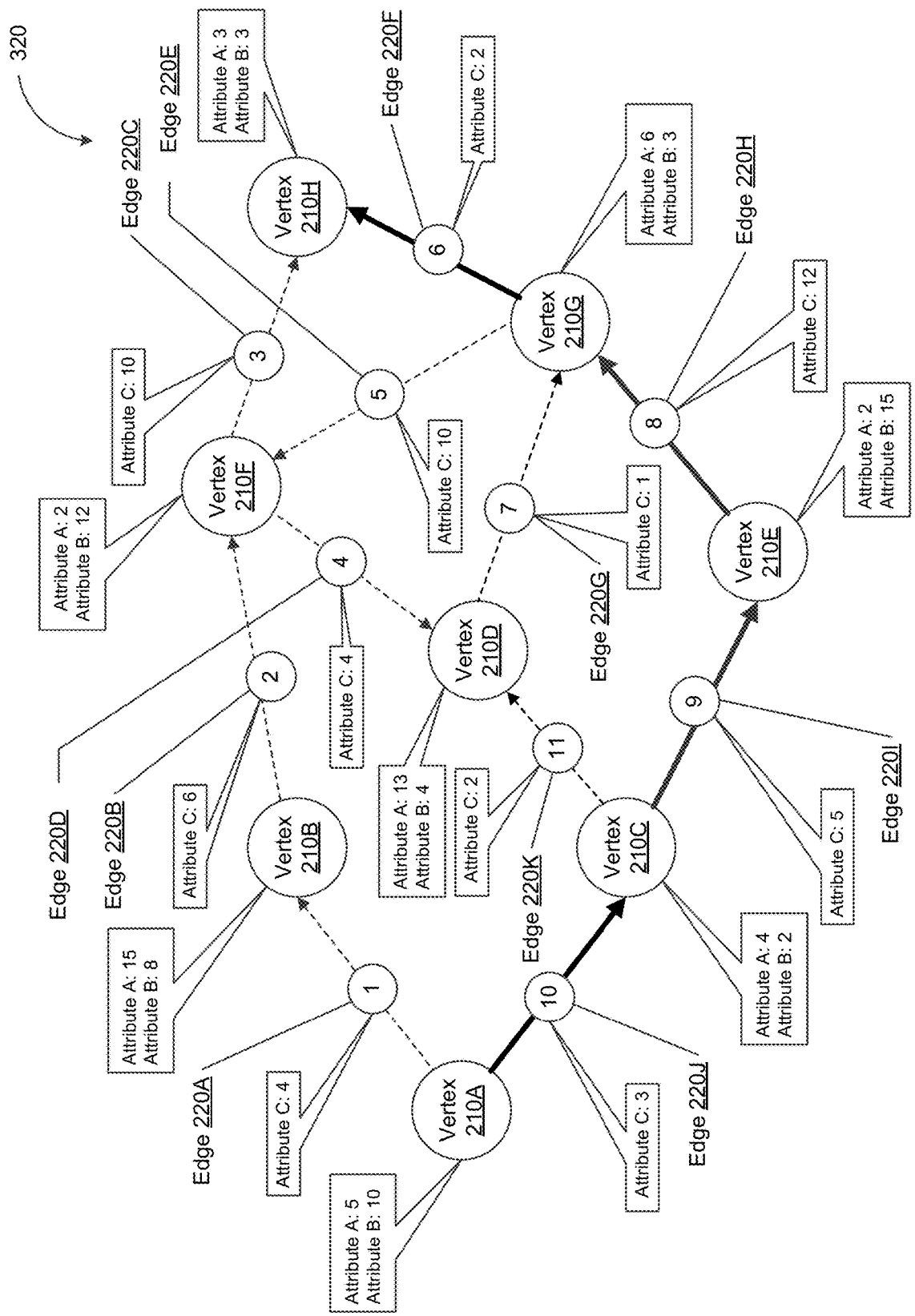
FIG. 3C depicts another example of a shortest path, in accordance with some example embodiments.

FIG. 3C depicts a shortest path 320, in accordance with some example embodiments. Referring to FIG. 3C, the shortest path 320 may be a shortest path between the first vertex 210A and the eighth vertex 210H that minimizes a sum of the values of the attribute A across the vertices included in the shortest path 320. Here, the weight associated with each vertex in the graph 200 may correspond to the respective values of the attribute A associated with each vertex in the graph 200. As such, in some example embodiments, the database management system 110, for example, the path finding engine 112, may identify the shortest path 320 based at least on a value of the attribute A associated with each of the first vertex 210A, the second vertex 210B, the third vertex 210C, the fourth vertex 210D, the fifth vertex 210E, the sixth vertex 210F, the seventh vertex 2110G, and/or the eighth vertex 210H.

Figure 3D:
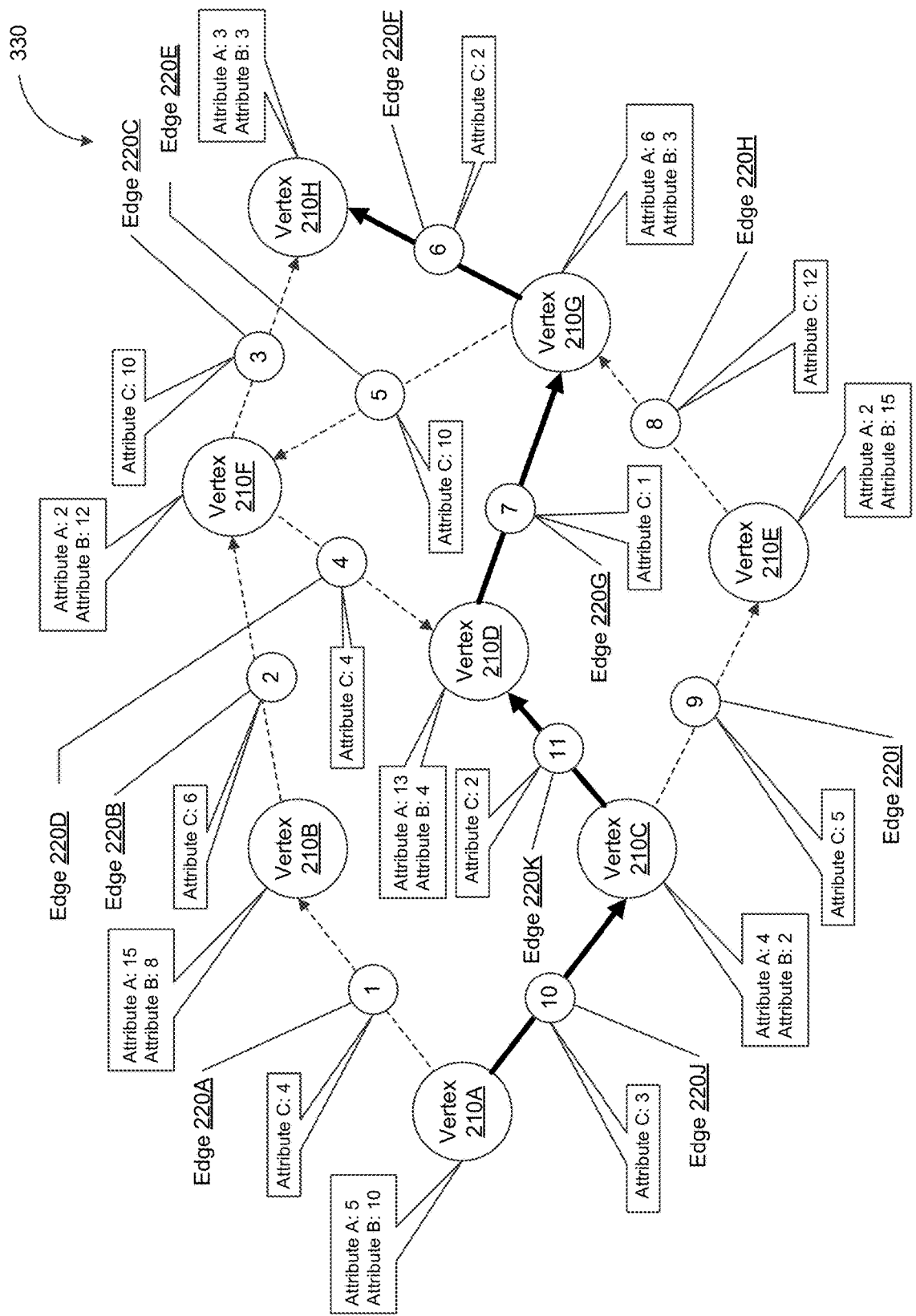
FIG. 3D depicts yet another example of a shortest path, in accordance with some example embodiments.

FIG. 3D depicts a shortest path 330, in accordance with some example embodiments. Referring to FIG. 3D, the shortest path 330 may be a shortest path between the first vertex 210A and the eighth vertex 210H that minimizes a sum of the values of the attribute B across the vertices included in the shortest path 330. The weight associated with each vertex in the graph 200 may correspond to the respective values of the attribute B associated with each vertex in the graph 200. As such, the database management system 110, for example, the path finding engine 112, may identify the shortest path 320 based at least on a value of the attribute B associated with each of the first vertex 210A, the second vertex 210B, the third vertex 210C, the fourth vertex 210D, the fifth vertex 210E, the sixth vertex 210F, the seventh vertex 2110G, and/or the eighth vertex 210H.

Figure 4A:
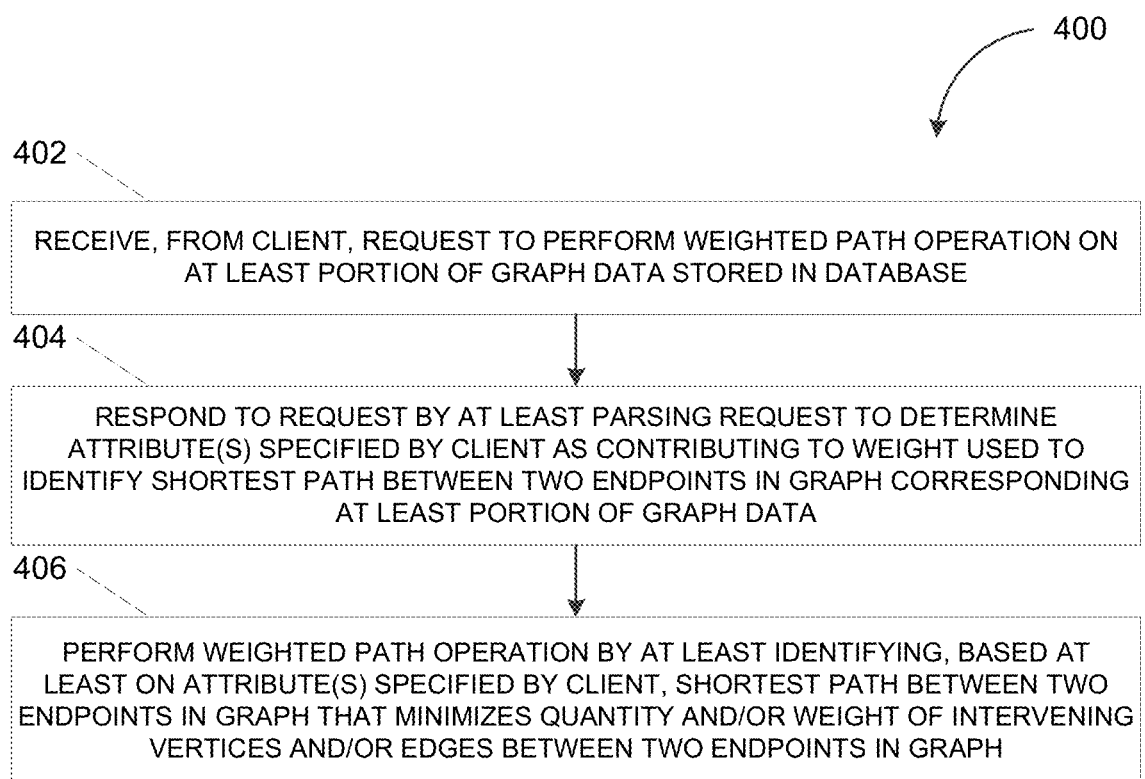
FIG. 4A depicts a flowchart illustrating a process for performing a path finding operation on graph data, in accordance with some example embodiments.

FIG. 4A depicts a flowchart illustrating a process 400 for performing a path finding operation on graph data, in accordance with some example embodiments. Referring to FIGS. 1-2, 3A-D, and 4A, the process 400 may be performed by the database management system 110, for example, by the path finding engine 112. In some example embodiments, the database management system 110 may perform the process 400 in order to identify a path between the two endpoints (e.g., the first vertex 210A and the eighth vertex 210H) in the graph 200.

At 402, the database management system 110 may receive, from the client 130, a request to perform a weighted path operation on at least a portion of graph data stored in a database. For example, in some example embodiments, the database management system 110 may receive, from the client 130, a request to perform a weighted path operation on at least a portion of the graph data stored in the database 115, for example, in the vertex table 120A and/or the edge table 120B. The graph data stored in the database 115 may correspond to the graph 200. Accordingly, the client 130 may request to perform the weighted path operation in order to identify a shortest path between two endpoints in the graph 200 such as, for example, the first vertex 210A and the eighth vertex 210H.

At 404, the database management system 110 may respond to the request by at least parsing the request from the client 130 to determine one or more attributes specified by the client 130 as contributing to the weight used to identify a shortest path between two endpoints in a graph corresponding to at least the portion of the graph data stored in the database. In some example embodiments, the shortest path between the two endpoints in the graph 200 may be determined based a weight corresponding to one or more attributes associated with each of the vertices and/or edges included in the graph 200. For example, the weight of a vertex and/or an edge may correspond to a function (e.g., sum, difference, product, quotient, and/or the like) of the attributes associated with the vertex and/or the edge.

As noted, the request from the client 130 may specify which attributes contribute to this weight. That is, the client 130 may indicate the attributes that should be minimized by the shortest path between the two endpoints. For instance, the request from the client 130 may indicate that the shortest path between the first vertex 210A and the eighth vertex 210H should minimize attribute A, attribute B, and/or attribute C. Alternatively and/or additionally, the request from the client 130 may indicate that the shortest path between the first vertex 210A and the eighth vertex 210H should minimize the quantity of intervening vertices and/or edges between the first vertex 210A and the eighth vertex 210H. Accordingly, the database management system 110, for example, the path finding engine 112, may respond to the request from the client 130 by at least determining which attributes (e.g., attribute A, attribute B, and/or attribute C) are specified by the client 130 as contributing to the weight used to identify the shortest path between the first vertex 210A and the eighth vertex 210H in the graph 200.

At 406, the database management system 110 may perform the weighted path operation by at least identifying, based on the one or more attributes specified by the client 130, a shortest path between two endpoints in the graph that minimizes a quantity and/or a weight of intervening vertices and/or edges between the two endpoints in the graph. For example, the database management system 110 may identify, based on the attributes specified in the request from the client 130, the path 300, the path 310, the path 320, and/or the path 330 as the shortest path between the first vertex 210A and the eighth vertex 210H. As noted the path 300 may minimize a quantity of intervening vertices and/or edges between the first vertex 210A and the eighth vertex 210H. Meanwhile, the path 310, the path 320, and the path 330 may respectively minimize the values of the attribute C, attribute A, and attribute B across the intervening vertices and/or edges between the first vertex 210A and the eighth vertex 210H.

Figure 4B:
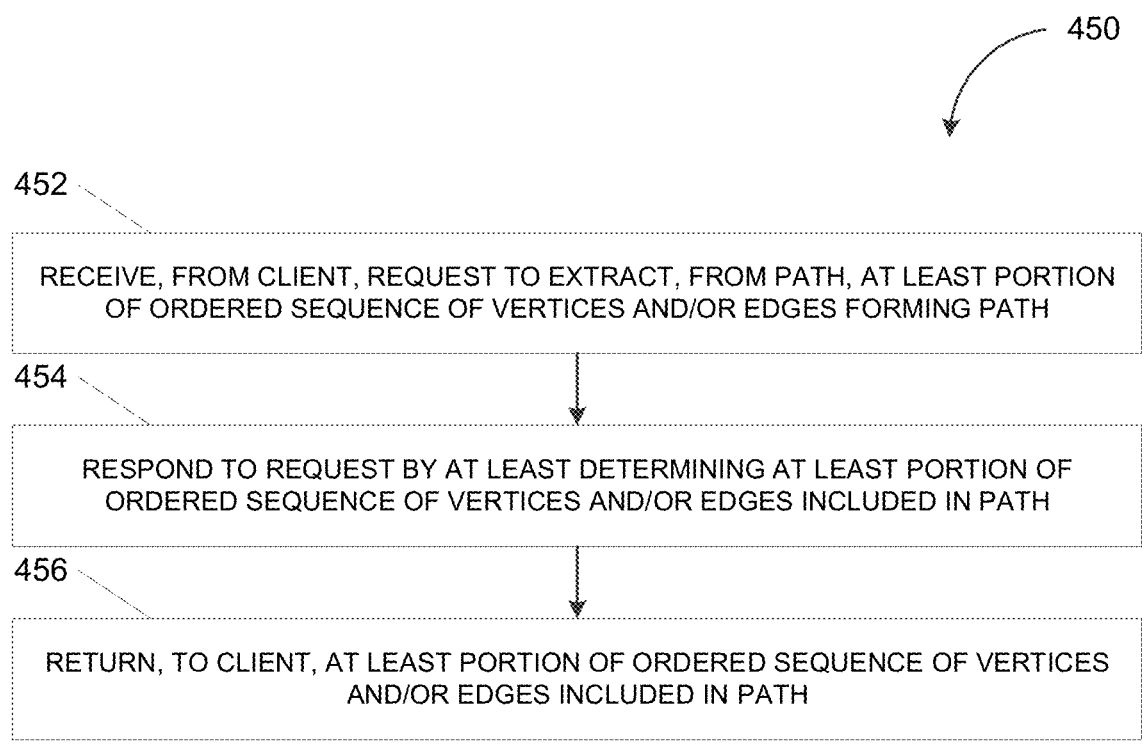
FIG. 4B depicts a flowchart illustrating a process for extracting a sequence of vertices and/or edges from a path, in accordance with some example embodiments.

FIG. 4B depicts a flowchart illustrating a process 450 for extracting a sequence of vertices and/or edges from a path, in accordance with some example embodiments. Referring to FIGS. 1-3 and 4B, the process 450 may be performed by the database management system 110, for example, by the sequence controller 114. In some example embodiments, the database management system 110 may perform the process 450 in order to extract, from a path (e.g., the path 300, the path 310, the path 320, and/or the path 330) between the two endpoints (e.g., the first vertex 210A and the eighth vertex 210H) in the graph 200, an ordered sequence of vertices and/or edges included in the path.

At 452, the database management system 110 may receive, from the client 130, a request to extract, from a path, at least a portion of an ordered sequence of vertices and/or edges forming the path. For example, in some example embodiments, the database management system 110 may receive, from the client 130, a request to extract a sequence of vertices and/or edges from a path between the first vertex 210A and the eighth vertex 220H in the graph 200. The path may be a shortest path identified, for example, by performing a weighted path operation on at least a portion of the graph data stored in the database 115 (e.g., in the vertex table 120A and/or the edge table 120B).

As noted, the shortest path between the first vertex 210A and the eighth vertex 210H may be, for example, the path 300, which minimizes the quantity of intervening vertices and/or edges between the first vertex 210A and the eighth path 210B. Alternatively and/or additionally, the shortest path between the first vertex 210A and the eighth path 210H may be, for example, the path 310, the path 320, and/or the path 330, which minimize one or more of the attributes (e.g., attribute A, attribute B, and/or attribute C) associated with the intervening vertices and/or edges between the first vertex 210A and the eighth vertex 210H.

At 454, the database management system 110 may respond to the request by at least determining at least the portion of an ordered sequence of vertices and/or edges included in the path. In some example embodiments, the shortest path between the first vertex 210A and the eighth vertex 210H may include an ordered sequence of vertices and/or edges. Accordingly, the database management system 110, for example, the sequence controller 114, may respond to the request by at least determining at least a portion of the ordered sequence of vertices and/or edges forming the shortest path between the first vertex 210A and the eighth vertex 210H such as, for example, the path 300, the path 310, the path 320, and/or the path 330.

At 456, the database management system 110 may return, to the client 130, at least the portion of the ordered sequence of vertices and/or edges included in the path. In some example embodiments, the database management system 110, for example, the sequence controller 114, may return, to the client 130, at least the portion of the ordered sequence of vertices and/or edges forming the shortest path between the first vertex 210A and the eighth vertex 210H. For instance, the database management system 110 may return, to the client 130, at least a portion of the ordered sequence of vertices and/or edges included in the path 300, the path 310, the path 320, and/or the path 330.

Figure 5:
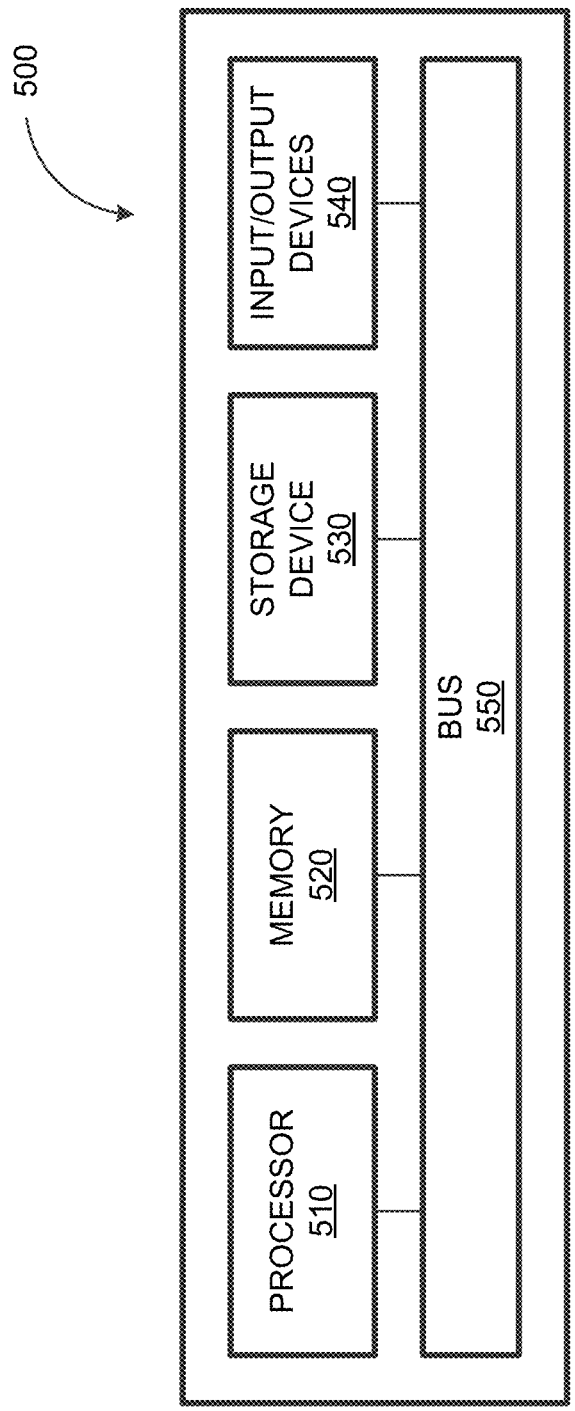
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database management system 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database management system 110. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a solid state drive, a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random query memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
      receiving, from a client, a request to perform a weighted path operation on at least a portion of graph data stored in a database, the portion of the graph data corresponding to a graph, the request specifying one or more attributes associated with a plurality of vertices and/or edges included in the graph; and
      in response to the request, performing the weighted path operation by at least identifying a shortest path between two endpoints in the graph, the shortest path minimizing the one or more attributes of one or more vertices and/or edges included in the shortest path.

2. The system of claim 1, wherein the database comprises a relational database that includes a vertex table and an edge table for storing the graph data, and wherein the storage of the graph data includes storing, in the vertex table and/or the edge table, the one or more attributes associated with the plurality of vertices and/or edges included in the graph.

3. The system of claim 1, further comprising:
   determining, for each of the plurality of vertices and/or edges, a weight corresponding to a function of the one or more attributes specified by the request.

4. The system of claim 3, wherein a same weight is assigned to each of the plurality of vertices and/or edges in order for the shortest path to minimize a quantity of intervening vertices and/or edges between the two endpoints.

5. The system of claim 3, wherein the shortest path is associated with a first weight comprising a sum of one or more weights associated with the one or more vertices and/or edges included in the shortest path, wherein the shortest path is identified based at least on the first weight being less than a second weight of at least one other path between the two endpoints, and wherein the first weight and/or the second weight are stored as a weight attribute of a corresponding path.

6. The system of claim 1, further comprising:
   responding to another request from the client by at least extracting, from the shortest path, at least a portion of an ordered sequence comprising the one or more vertices and/or edges included in the shortest path.

7. The system of claim 1, wherein the performance of the weighted path operation further comprises generating a weighted path object corresponding to the shortest path.

8. The system of claim 7, wherein the weighted path object comprises a snapshot of the graph, wherein the snapshot of the graph inherits all attributes and/or temporary attributes associated with the plurality of vertices and/or edges included in the graph, and wherein changes to the attributes and/or temporary attributes are not propagated to the snapshot of the graph.

9. The system of claim 1, wherein the two end points comprise a vertex and/or an edge from the graph.

10. The system of claim 1, wherein the weighted path operation comprises a stored procedure such that executable code associated with the weighted path operation is stored in the database.

11. A computer-implemented method, comprising:
   receiving, from a client, a request to perform a weighted path operation on at least a portion of graph data stored in a database, the portion of the graph data corresponding to a graph, the request specifying one or more attributes associated with a plurality of vertices and/or edges included in the graph; and
   in response to the request, performing the weighted path operation by at least identifying a shortest path between two endpoints in the graph, the shortest path minimizing the one or more attributes of one or more vertices and/or edges included in the shortest path.

12. The method of claim 11, wherein the database comprises a relational database that includes a vertex table and an edge table for storing the graph data, and wherein the storage of the graph data includes storing, in the vertex table and/or the edge table, the one or more attributes associated with the plurality of vertices and/or edges included in the graph.

13. The method of claim 11, further comprising:
determining, for each of the plurality of vertices and/or edges, a weight corresponding to a function of the one or more attributes specified by the request.

14. The method of claim 13, wherein a same weight is assigned to each of the plurality of vertices and/or edges in order for the shortest path to minimize a quantity of intervening vertices and/or edges between the two endpoints.

15. The method of claim 13, wherein the shortest path is associated with a first weight comprising a sum of one or more weights associated with the one or more vertices and/or edges included in the shortest path, wherein the shortest path is identified based at least on the first weight being less than a second weight of at least one other path between the two endpoints, and wherein the first weight and/or the second weight are stored as a weight attribute of a corresponding path.

16. The method of claim 11, further comprising:
responding to another request from the client by at least extracting, from the shortest path, at least a portion of an ordered sequence comprising the one or more vertices and/or edges included in the shortest path.

17. The method of claim 11, wherein the performance of the weighted path operation further comprises generating a weighted path object corresponding to the shortest path.

18. The method of claim 17, wherein the weighted path object comprises a snapshot of the graph, wherein the snapshot of the graph inherits all attributes and/or temporary attributes associated with the plurality of vertices and/or edges included in the graph, and wherein changes to the attributes and/or temporary attributes are not propagated to the snapshot of the graph.

19. The method of claim 11, wherein the two end points comprise a vertex and/or an edge from the graph.

20. A non-transitory computer-readable medium storing instructions, which when executed by at least one data processor, result in operations comprising:
receiving, from a client, a request to perform a weighted path operation on at least a portion of graph data stored in a database, the portion of the graph data corresponding to a graph, the request specifying one or more attributes associated with a plurality of vertices and/or edges included in the graph; and
in response to the request, performing the weighted path operation by at least identifying a shortest path between two endpoints in the graph, the shortest path minimizing the one or more attributes of one or more vertices and/or edges included in the shortest path.

* * * * *